(12) United States Patent
Yanagisawa (10) Patent No.: US 11,272,102 B2
(45) Date of Patent: Mar. 8, 2022

(54) IMAGE CAPTURING APPARATUS, CONTROL METHOD OF IMAGE CAPTURING APPARATUS, AND CONTROL METHOD OF INFORMATION PROCESSING APPARATUS

(71) Applicant: CANON KABUSHIKI KAISHA, Tokyo (JP)

(72) Inventor: Takafumi Yanagisawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/813,007

(22) Filed: Mar. 9, 2020

(65) Prior Publication Data

US 2020/0296297 A1 Sep. 17, 2020

(30) Foreign Application Priority Data

Mar. 11, 2019 (JP) .............................. JP2019-044193

(51) Int. Cl.
*H04N 5/232* (2006.01)

(52) U.S. Cl.
CPC ... *H04N 5/232411* (2018.08); *H04N 5/23206* (2013.01); *H04N 5/23245* (2013.01); *H04N 5/23299* (2018.08)

(58) Field of Classification Search
CPC ......... H04N 5/232411; H04N 5/23245; H04N 5/23299; H04N 5/23206; H04N 7/183; G08B 13/19617
See application file for complete search history.

(56) References Cited

U.S. PATENT DOCUMENTS

2011/0157460 A1* 6/2011 Kim ................. H04N 5/232411
348/372
2014/0184824 A1* 7/2014 Matsuda ............ H04N 1/00095
348/207.1

FOREIGN PATENT DOCUMENTS

JP 2004-328271 A 11/2004

* cited by examiner

*Primary Examiner* — Timothy J Henn
(74) *Attorney, Agent, or Firm* — Cowan, Liebowitz & Latman, P.C.

(57) ABSTRACT

An image capturing apparatus having an image capturing unit comprises a storage control unit configured to store, in a memory, a single image captured by the image capturing unit, upon receiving a transition request to a standby state in which an image capturing function of the image capturing unit is deactivated, and a transmission unit configured to transmit an image stored in the memory, upon the image capturing apparatus in the standby state receiving an image acquisition request.

17 Claims, 7 Drawing Sheets

IMAGE CAPTURING APPARATUS, CONTROL METHOD OF IMAGE CAPTURING APPARATUS, AND CONTROL METHOD OF INFORMATION PROCESSING APPARATUS

BACKGROUND OF THE INVENTION

Field of the Invention

The present invention relates to an image capturing technique.

Description of the Related Art

In the related art, there are image capturing apparatuses that can distribute captured images, modify settings, or the like via a network. Generally, when operating an image capturing apparatus connected via a network, there exist an application for searching the IP (Internet Protocol) address for connecting to the image capturing apparatus. The application lists image capturing apparatuses connected to the network. Some of such image capturing apparatuses may have a standby mode (standby state) intended for power saving.

In the related art, for an image capturing apparatus having a plurality of modes, a technique has been used that changes data to be output for each mode. For example, Japanese Patent Laid-Open No. 2004-328271 discloses a technique for transmitting a digital image captured by a shooting operation or a reproduced digital image selected by a reproducing operation, according to whether the operation state of the image capturing apparatus is in a shooting mode or a reproducing mode.

Thumbnail images acquired from video images being distributed by an image capturing apparatus found by the aforementioned search may be displayed as a list, and the listed thumbnail images may be checked to select a desired camera. However, an image capturing apparatus in the standby state does not perform image capturing, and thus no video image can be acquired from such an image capturing apparatus. It is therefore impossible to acquire a thumbnail image corresponding to the image capturing apparatus in the standby state, and the aforementioned list of thumbnail images does not display any thumbnail image corresponding to the image capturing apparatus in the standby state. Accordingly, there has been a problem in such a related-art technique that it is difficult for the user to find an "image capturing apparatus in the standby state".

SUMMARY OF THE INVENTION

The present invention provides a technique that can provide images required for the aforementioned list, even when the image capturing apparatus is in the standby state.

According to the first aspect of the present invention, there is provided an image capturing apparatus having an image capturing unit, the image capturing apparatus comprising: a storage control unit configured to store, in a memory, a single image captured by the image capturing unit, upon receiving a transition request to a standby state in which an image capturing function of the image capturing unit is deactivated; and a transmission unit configured to transmit an image stored in the memory, upon the image capturing apparatus in the standby state receiving an image acquisition request.

According to the second aspect of the present invention, there is provided a control method of an image capturing apparatus having an image capturing unit, the method comprising: storing, in a memory, a single image captured by the image capturing unit, upon receiving a transition request to a standby state in which an image capturing function of the image capturing unit is deactivated; and transmitting the image stored in the memory, upon the image capturing apparatus in the standby state receiving an image acquisition request.

According to the third aspect of the present invention, there is provided a control method of an information processes apparatus, comprising: receiving captured images transmitted from a plurality of image capturing apparatuses and displaying respective ones of the received captured images in a manner that allows for distinguishing between images captured by an image capturing apparatus whose image capturing function has not been deactivated, and images captured by an image capturing apparatus whose image capturing function has been deactivated.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1:
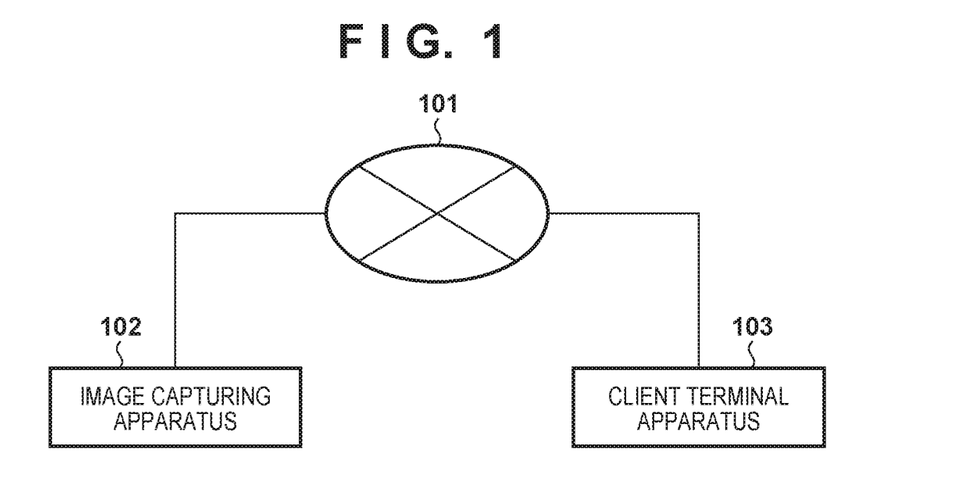
FIG. 1 is a block diagram illustrating a configuration example of a system.

First, a configuration example of a system according to the embodiment will be described, referring to the block diagram of FIG. 1. As illustrated in FIG. 1, the system according to the present embodiment includes an image capturing apparatus 102 and a client terminal apparatus 103, the image capturing apparatus 102 and the client terminal apparatus 103 being connected to a network 101.

Next, the image capturing apparatus 102 will be described. The image capturing apparatus 102 may be an image capturing apparatus that captures motion images, or may be an image capturing apparatus that captures static images regularly or irregularly. In the former case, the image capturing apparatus 102 transmits (distributes), as captured images, images of respective frames forming the motion image to the client terminal apparatus 103 via the network 101. On the other hand, in the latter case, the image capturing apparatus 102 transmits (distributes), as captured images, respective static images captured regularly or irregularly to the client terminal apparatus 103 via the network 101. The image capturing apparatus 102 performs processes in accordance with various requests from the client terminal apparatus 103. The hardware configuration example of the image capturing apparatus 102 will be described, referring to the block diagram of FIG. 2.

Figure 2:
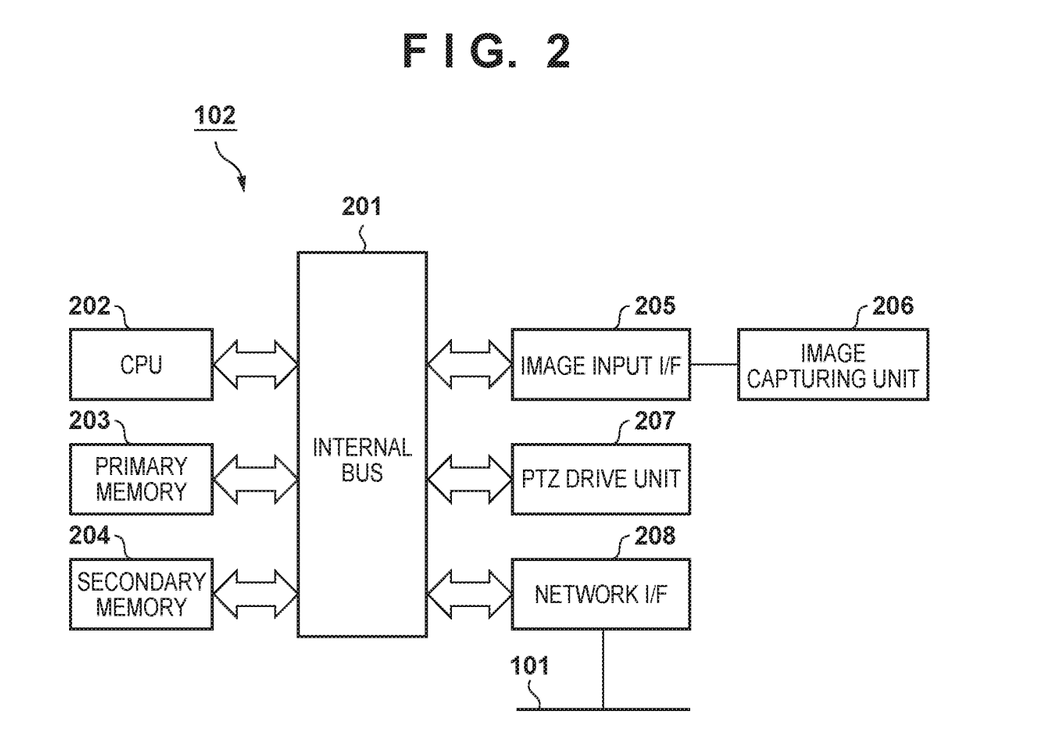
FIG. 2 is a block diagram illustrating a hardware configuration example of an image capturing apparatus 102.

A CPU 202 performs various processes using computer programs and data stored in a primary memory 203. The CPU 202 thus controls the overall operation of the image capturing apparatus 102, and also performs or controls respective processes described below with the assumption to be performed by the image capturing apparatus 102.

The primary memory 203 is a high-speed, read and writable storage device represented by a RAM. The primary memory 203 has an area for storing computer programs (OS (operating system) and various computer programs described below) or data loaded from the secondary memory 204. Furthermore, the primary memory 203 has an area for storing captured images received from an image capturing unit 206 via an image input I/F (interface) 205, and various information received from the client terminal apparatus 103 via a network I/F 208. Furthermore, the primary memory 203 has a work area used when the CPU 202 performs various processes. The primary memory 203 can thus provide various areas as appropriate.

The secondary memory 204, which is a non-volatile storage device represented by an HDD (hard disk drive), a flash memory, an SD card, or the like, may be configured to be removable. The secondary memory 204 has stored therein the OS, various computer programs described below, and various data described below. The computer programs and data stored in the secondary memory 204 include computer programs and data for causing the CPU 202 to perform or control respective processes described below with the assumption to be performed by the image capturing apparatus 102. Note that the captured images received from the image capturing unit 206 via the image input I/F (interface) 205 and the various information received from the client terminal apparatus 103 via the network I/F 208 may be stored in the secondary memory 204.

The computer programs and data stored in the secondary memory 204 are loaded on the primary memory 203 as appropriate in accordance with the control of the CPU 202, and subject to processing by the CPU 202.

The image input I/F 205 is an interface for connecting the image capturing unit 206. The images captured by the image capturing unit 206 (images of respective frames in a motion image, static images captured regularly or irregularly) are transmitted to the primary memory 203 and the secondary memory 204 via the image input I/F 205. The images captured by the image capturing unit 206 may also be transmitted to the client terminal apparatus 103 via the network I/F 208.

A PTZ drive unit 207 controls a motor (not illustrated) or the like to control P (pan), T (tilt), Z (zoom) of the image capturing apparatus 102. Note that the PTZ drive unit 207 may conduct not only PTZ control but also other settings or control in the image capturing apparatus 102 such as focus or white balance.

The network I/F 208 is an interface for connecting the image capturing apparatus 102 to the network 101. The image capturing apparatus 102 performs data communication with the client terminal apparatus 103 via the network I/F 208.

The CPU 202, the primary memory 203, the secondary memory 204, the image input I/F 205, the PTZ drive unit 207, and the network I/F 208 are all connected to the internal bus 201.

Note that, for ease of explanation, FIG. 1 displays a configuration of a system in which a single client terminal apparatus 103 and a single image capturing apparatus 102 are connected to the network 101. However, the number of the image capturing apparatuses 102 and the client terminal apparatus 103 connected to the network 101 is not limited to one and may be more than one.

Next, the client terminal apparatus 103 will be described. The client terminal apparatus 103 is a computer apparatus (information processing apparatus) such as a PC (personal computer), a tablet terminal apparatus, a smart phone, or the like. The hardware configuration example of the client terminal apparatus 103 will be described, referring to the block diagram of FIG. 9.

Figure 9:
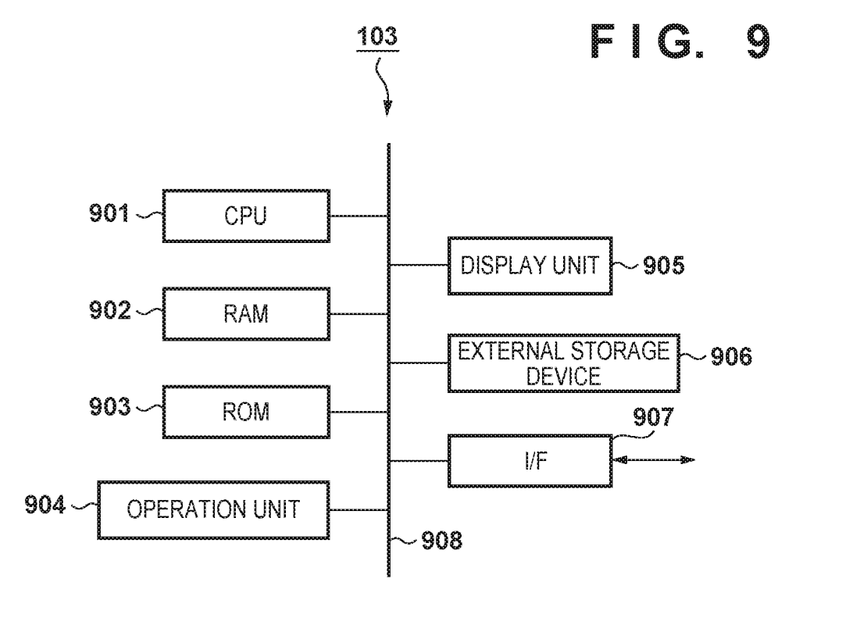
FIG. 9 is a block diagram illustrating a hardware configuration example of the client terminal apparatus 103.

A CPU 901 performs various processes using computer programs and data stored in a RAM 902 or a ROM 903. Therefore, the CPU 901 controls the overall operation of the client terminal apparatus 103, and also performs or controls respective processes described below with the assumption to be performed by the client terminal apparatus 103.

The RAM 902 has an area for storing computer programs or data loaded from the ROM 903 or an external storage device 906, or data received from the image capturing apparatus 102 via an I/F 907. The RAM 902 also has a work area used when the CPU 901 performs various processes. The RAM 902 can thus provide various areas as appropriate. The ROM 903 has stored therein setting data, an activation program, or the like for the client terminal apparatus 103.

An operation unit 904 is a user interface such as a keyboard, a mouse, a touch panel screen, or the like, which may be operated by the user to input various instructions to the CPU 901.

A display unit 905, having a liquid crystal screen or a touch panel screen, can display results of processing by the CPU 901 via images, characters, or the like. Note that the display unit 905 may be a projection device such as a projector that projects images or characters. Note that the operation unit 904 and the display unit 905 may be integrated to form a touch panel screen.

The external storage device 906 is a large-capacity information storage device represented by a hard disk drive or a flash memory. The external storage device 906 has stored therein computer programs and data for causing the CPU 901 to perform or control respective processes described below with the assumption to be performed by the client terminal apparatus 103. The computer programs and data stored in the external storage device 906 are loaded to the RAM 902 as appropriate in accordance with the control of the CPU 901, so as to be processed by the CPU 901.

The I/F 907 is intended to connect the client terminal apparatus 103 to the network 101, and the client terminal apparatus 103 performs data communication with the image capturing apparatus 102 via the I/F 907.

The CPU 901, the RAM 902, the ROM 903, the operation unit 904, the display unit 905, the external storage device 906, and the I/F 907 are all connected to the bus 908. Note that the hardware configuration applicable to the client terminal apparatus 103 is not limited to the configuration illustrated in FIG. 9.

Next, the network 101 of FIG. 1 will be described. The network 101 is realized by a plurality of routers, switches, cables, or the like complying with a communication standard such as the ETHERNET (registered trademark), for example. Note that the network 101 may be realized by the Internet, wired LAN (Local Area Network), wireless LAN, WAN (Wide Area Network), or the like.

Figure 3:
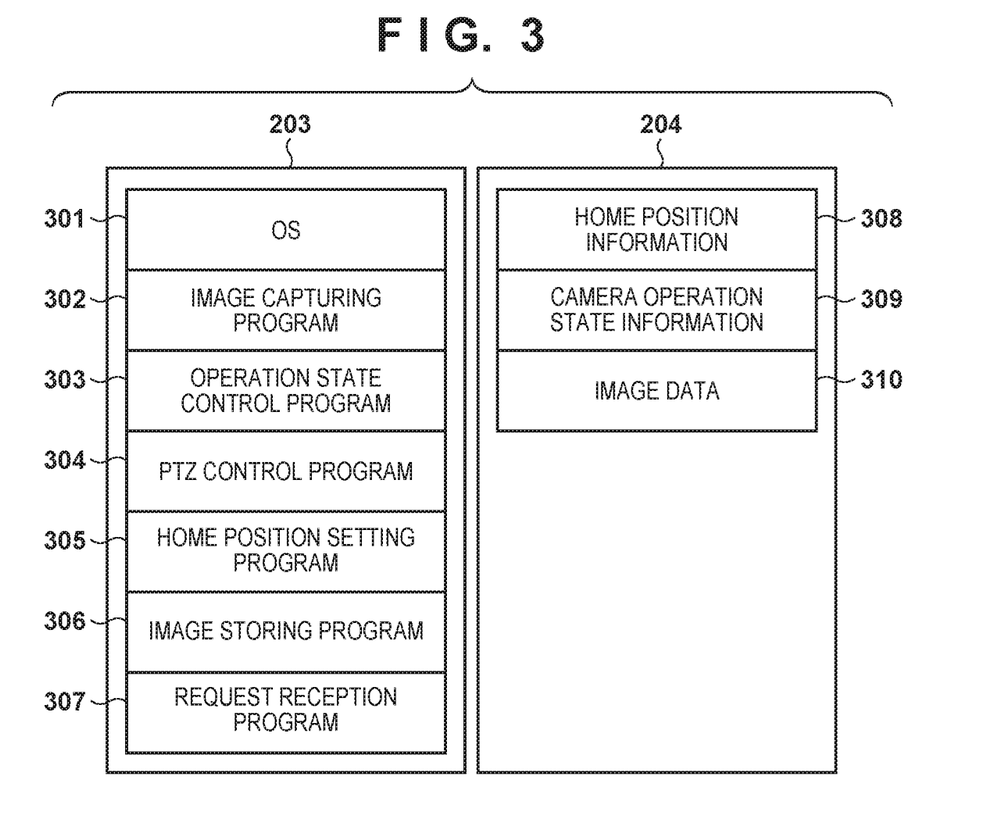
FIG. 3 illustrates a computer program in a primary memory 203 and data in a secondary memory 204.

Next, the computer programs loaded from the secondary memory 204 to the primary memory 203 of the image capturing apparatus 102, the data stored and managed in the secondary memory 204 will be described, referring to FIG. 3.

Note that, although explanation may be provided below mainly focusing on computer programs as the entity of processing, corresponding functions are actually realized by the CPU 202 executing the computer programs.

An OS 301 is a basic program for controlling the entire image capturing apparatus 102. Here, location (address) and size of respective programs (302 to 307) described below in the primary memory 203 is managed by the OS 301.

An image capturing program 302 is a computer program for implementing the image capturing function of the image capturing apparatus 102. For example, the image capturing program 302 performs an operation of acquiring a captured image from the image capturing unit 206 in accordance with an image acquisition request received from the client terminal apparatus 103 or an instruction from another computer program. The image capturing program 302 converts the acquired captured image into an image of the JPEG format or the like, or into a motion image of the H.264 format or the like.

An operation state control program 303 manages the operation state of the image capturing apparatus 102. It is assumed in the present embodiment that the operation state of the image capturing apparatus 102 includes two types: activation state and standby state. The activation state is a state in which all the functions in the image capturing apparatus 102 are active, and the standby state is a state in which some of the image capturing functions are deactivated despite that the image capturing apparatus 102 is being powered. Although it is assumed in the present embodiment that, for ease of explanation, only the image capturing function is deactivated in the standby state, other functions may also be additionally deactivated, such as PTZ control or setting change of the image capturing apparatus 102. As thus described, the standby state in the present embodiment is a state in which at least the image capturing function is deactivated.

The operation state control program 303, upon receiving from the client terminal apparatus 103 a transition request to the standby state, deactivates the image capturing program 302 so as to deactivate the image capturing function. In addition, the operation state control program 303, upon receiving from the client terminal apparatus 103 a transition request to the standby state, causes a PTZ control program 304 to move the PTZ of the image capturing apparatus 102 to its home position.

In addition, the operation state control program 303, upon receiving from the client terminal apparatus 103 a transition request to the activation state, activates the image capturing program 302 to activate the image capturing function. The function to be activated in response to receiving from the client terminal apparatus 103 a transition request to the activation state is a function deactivated when transitioning to the standby state.

The operation state control program 303, upon transitioning of the operation state of the image capturing apparatus 102 (from activation state to standby state or from standby state to activation state), stores information indicating the post-transition operation state in the secondary memory 204 as camera operation state information 309.

The PTZ Control program 304 is a control program for driving and controlling the PTZ drive unit 207 to change the PTZ of the image capturing apparatus 102.

A home position setting program 305 is a program for setting a home position. Here, a home position is an initial PTZ (selling value) of the image capturing apparatus 102 (image capturing unit 206) when the operation state of the image capturing apparatus 102 transitions from the standby state to the activation state. The user operates the operation unit 904 at the client terminal apparatus 103 to set a home position or change an already set home position, the set or changed home position is transmitted to the image capturing apparatus 102 via the network 101. The home position setting program 305 receives the home position transmitted from e client terminal apparatus 103 and stores the received home position in the secondary memory 204 as home position information 308. Although it is assumed in the present embodiment that the home position includes only the initial PTZ, this is not limiting and any information may be included provided that it defines the initial state of the image capturing apparatus 102 (image capturing unit 206) when the operation state of the image capturing apparatus 102 transitions from the standby state to the activation state. For example, the home position may include other setting information such as a value of focus or white balance of the image capturing unit 206.

An image storing program 306, upon receiving from the client terminal apparatus 103 a transition request to the standby state, acquires one of captured images from the image capturing program 302, and stores the acquired captured image in the secondary memory 204 as image data 310. Note that, in a case where the image data 310 is already stored in the secondary memory 204, the image storing program 306 overwrites the one of captured images acquired from the image capturing program 302 on the image data 310. The image storing program 306 performs such a storage control of images. The one of captured images to be acquired from the image capturing program 302 may be any image provided that it is captured before transitioning to the standby state. For example, the image may be one that has been recently captured before transitioning to the standby state, or one that has been captured within a defined time period before transitioning to the standby state.

A request reception program 307 is a program for receiving various requests (image acquisition request, transition request, or the like) transmitted from the client terminal apparatus 103. The request transmitted from the client terminal apparatus 103 may be transmitted using a general communication protocol such as http (Hypertext Transfer Protocol).

Next, a process for transitioning to the standby state in response to receiving the transition request to the standby state by the image capturing apparatus 102 from the client terminal apparatus 103 will be described in accordance with the flowchart of FIG. 4.

At step S401, the request receive program 307 receives, from the client terminal apparatus 103, a transition request to the standby state. At step S402, the request receive program 307 inquires to the operation state control program 303 whether the current operation state of the image capturing apparatus 102 is in the activation state or the standby state. The operation state control program 303 returns, to the request reception program 307, the current operation state of the image capturing apparatus 102 indicated by the camera operation state information 309 stored in the secondary memory 204.

The request reception program 307 instructs the operation state control program 303 to transition to the standby state in a case where the operation state of the image capturing apparatus 102 returned from the operation state control program 303 is in the activation state. The process then proceeds to step S403.

Figure 4:
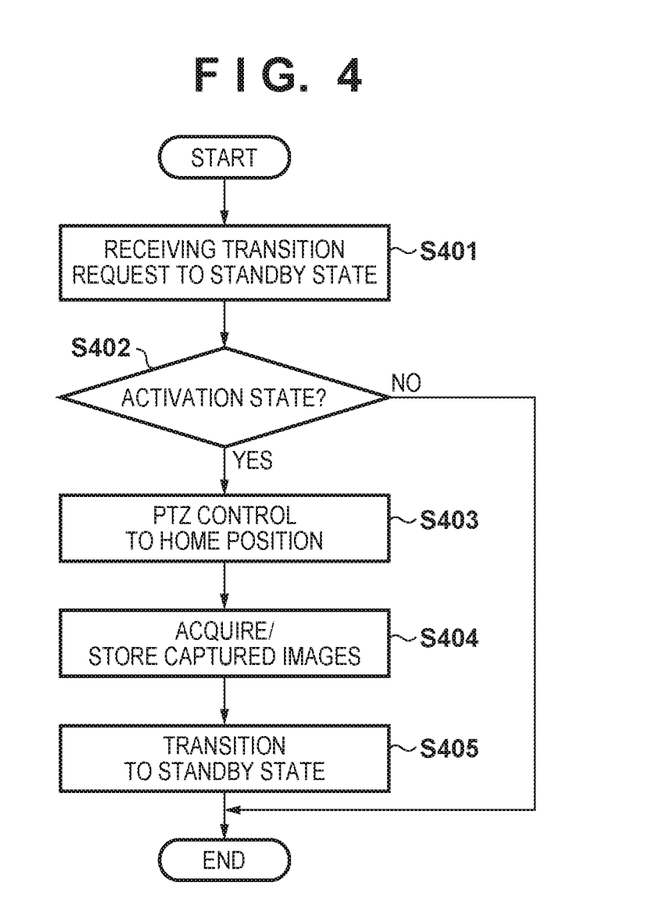
FIG. 4 is a flowchart of a process performed by the image capturing apparatus 102.

On the other hand, the request reception program 307 does nothing and terminates the process described in the flowchart of FIG. 4, in a case where the operation state of the image capturing apparatus 102 returned from the operation state control program 303 is in the standby state.

At step S403, the operation state control program 303 instructs the PTZ, control program 304 to perform a PTZ control to return to the home position. The PTZ control program 304 reads the home position information 308 stored in the secondary memory 204, and performs a PTZ control to move the PTZ of the image capturing apparatus 102 to the initial PTZ indicated by the read-in home position information 308.

At step S404, the operation state control program 303 issues an instruction to the image storing program 306 to acquire and store the most recent image. The image storing program 306 acquires one of captured images from the image capturing program 302, and stores (overwrites) the acquired captured image in the secondary memory 204 as the image data 310. The captured image to be stored may be stored after being subjected to rendering as appropriate. For example, the one of captured images acquired from the image capturing program 302 may be subjected to image processing or processes such as character superimposition so as to be distinguished from live-distributed images. Furthermore, resolution, image format, or the like may be changed when storing the captured image.

At step S405, the operation state control program 303 deactivates the image capturing program 302 to deactivate the image capturing function and transition to the standby state. Note that other processes may be performed at step S405, in addition to deactivating the image capturing function. For example, processes may be performed such as moving the PTZ position to a standby-state position, or providing a reception limit with regard to requests for changing the setting of the image capturing apparatus 102 by the request reception program 307 besides image acquisition requests or transition requests to the activation state.

The operation state control program 303 then updates the camera operation state information 309 stored in the secondary memory 204 to information indicating that the current operation state of the image capturing apparatus 102 is in the standby state.

Figure 6:
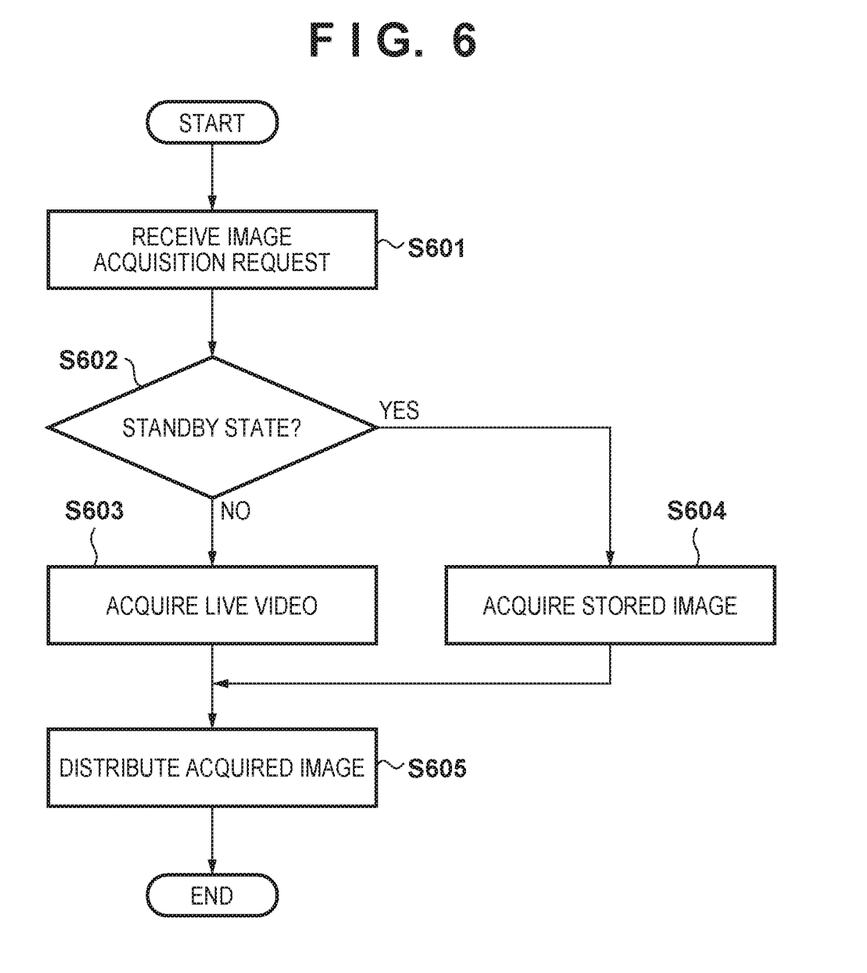
FIG. 6 is a flowchart of a process performed by the image capturing apparatus 102.

Next, a process to be performed in response to receiving the image acquisition request by the image capturing apparatus 102 from the client terminal apparatus 103 will be described in accordance with the flowchart of FIG. 6.

At step S601, the request reception program 307 acquires the image acquisition request transmitted from the client terminal apparatus 103. At step S602, the request receive program 307 inquires to the operation state control program 303 whether the current operation state of the image capturing apparatus 102 is in the activation state or the standby state. The operation state control program 303 returns, to the request reception program 307, the current operation state of the image capturing apparatus 102 indicated by the camera operation state information 309 stored in the secondary memory 204.

In a case where the operation state of the image capturing apparatus 102 is in the activation state (i.e., performing image capturing), the process proceeds to step S603. On the other hand, the process proceeds to step S604 in a case where the operation state of the image capturing apparatus 102 is in the standby state.

At step S603, the request reception program 307 acquires the captured image from the image capturing program 302 as a live video. On the other hand, at step S604, the request reception program 307 acquires the image data 310 stored in the secondary memory 204.

Subsequently, at step S605, the request reception program 307 transmits (distributes) the live video acquired at step S603 or the image data 310 acquired at step S604 to the client terminal apparatus 103 via the network I/F 208.

Figure 5:
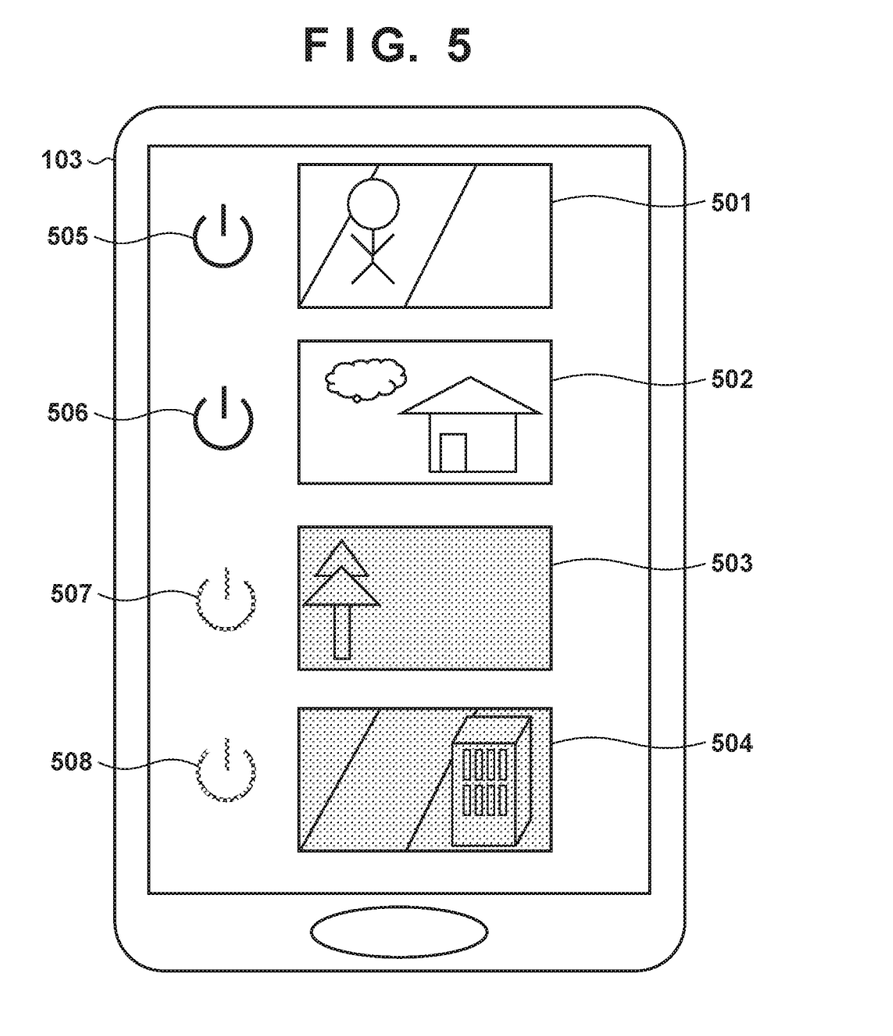
FIG. 5 illustrates an example of displaying a list on a client terminal apparatus 103.

FIG. 5 illustrates an example of displaying a list of information received from the image capturing apparatus 102 in response to transmitting, by the client terminal apparatus 103, the image acquisition request to each of the four image capturing apparatuses 102, in a case where four image capturing apparatuses 102 are connected to the network I/F 208.

Captured images 501 and 502 are captured images (live video) received from the image capturing apparatus 102 in the activation state. In the example of FIG. 5, each of the image capturing apparatuses 102 is transmitting not only the captured images but also the camera operation state information 309 to the client terminal apparatus 103. However, there is displayed a mark 505 on the left side of the captured image 501, indicating that the captured image 501 has been received from the image capturing apparatus 102 in the activation state. Similarly, there is displayed a mark 506 on the left side of the captured image 502, indicating that the captured image 502 has been received from the image capturing apparatus 102 in the activation state.

Captured images 503 and 504 are captured images (image data 310) received from the image capturing apparatus 102 in the standby state. There is displayed a mark 507 on the left side of the captured image 503, indicating that the captured image 503 has been received from the image capturing apparatus 102 in the standby state. There is displayed a mark 508 on the left side of the captured image 504, indicating that the captured image 504 has been received from the image capturing apparatus 102 in the standby state. In FIG. 5, the marks 505 and 506 indicating that the captured images are received from the image capturing apparatus 102 in the activation state are displayed with a darker color than the marks 507 and 508 indicating that the captured images are received from the image capturing apparatus 102 in the standby state. Note that it suffices to display (control display of) the marks corresponding to captured images received from the image capturing apparatus 102 in the activation state and the marks corresponding to captured images received from the image capturing apparatus 102 in the standby state as marks distinguishable from each other, with the display method not being limited to any specific display method.

Upon the user's pointing the mark 507 (the user may point using the operation unit 904, or tap the mark 507 on the display screen), the client terminal apparatus 103 transmits, to the image capturing apparatus 102 that has captured the captured image 503, a transition request to the activation state. The same goes for the case of pointing the mark 508, in which the client terminal apparatus 103 transmits, to the image capturing apparatus 102 that has captured the captured image 504, a transition request to the activation state. Here, a captured image may be pointed instead of a mark.

Furthermore, in addition to, or instead of displaying marks, the method of displaying a captured image as it is may be changed according to whether the captured image has been received from the image capturing apparatus 102 in the standby state, or from the image capturing apparatus 102 in the activation state. In the example of FIG. 5, the captured images 503 and 504 received from the image capturing apparatus 102 in the standby state are displayed darker than the captured images 501 and 502 received from the image capturing apparatus 102 in the activation state.

As thus described, according to the present embodiment, images whose image capturing direction at the time of activating the image capturing apparatus is known can be acquired also from the image capturing apparatus in the standby state, and therefore it becomes easier for a user to select an image capturing apparatus that the user desires to activate from a list of image capturing apparatuses, thereby improving the convenience.

Note that, although the aforementioned process has been achieved in the present embodiment by executing a computer program (other than the OS 301) stored in the primary memory 203, one or more functions of the computer program other than the OS 301 may be implemented by hardware.

Second Embodiment

In the following embodiments including the present embodiment, difference from the first embodiment will be described, assuming that the following embodiments are similar to the first embodiment unless otherwise specified. In the present embodiment, there will be described an example of storing or updating the image data 310 also in the activation state.

Figure 7:
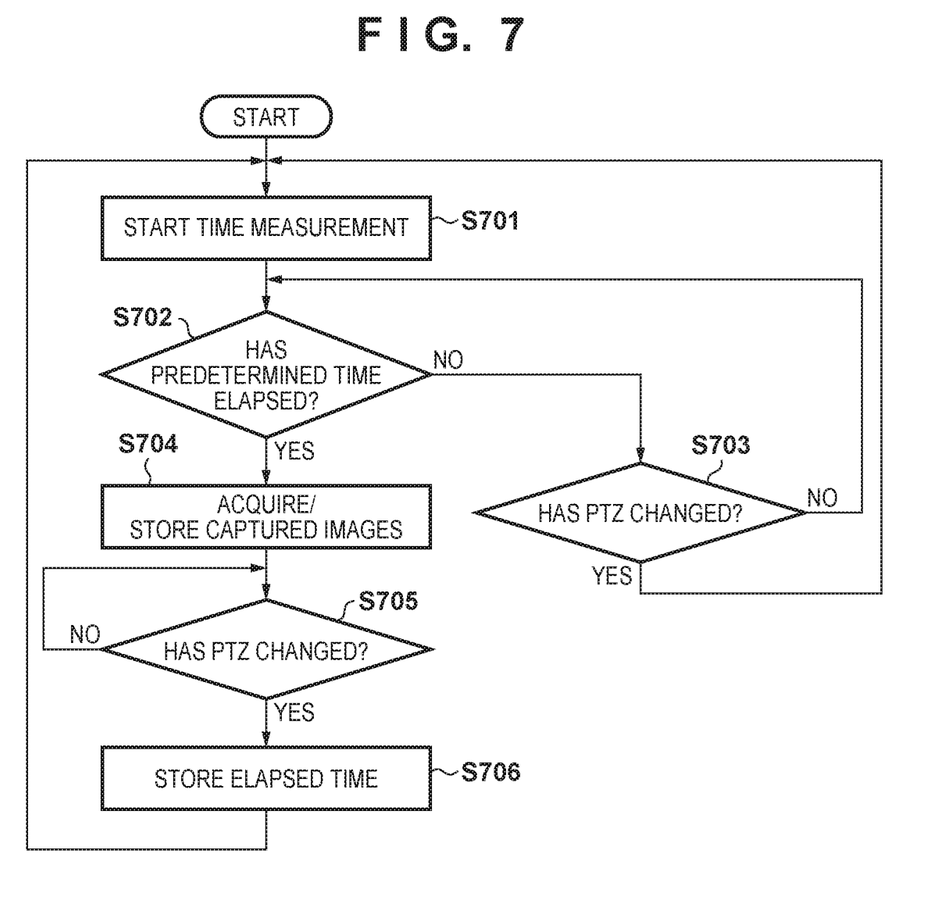
FIG. 7 is a flowchart of a process performed by the image capturing apparatus 102.

In the present embodiment, the image capturing apparatus 102 in the activation state performs a process according to the flowchart illustrated in FIG. 7. At step S701, the image storing program 306 starts clocking (starts time measurement).

At step S702, the image storing program 306 determines whether or not the time being clocked has exceeded a predetermined time (predetermined time) The predetermined time may be a time period such as 30 minutes, for example, which is a default setting in the image capturing apparatus 102, a time period preliminarily set by the user in the image capturing apparatus 102 or the client terminal apparatus 103, or elapsed time acquired at step S706 described below.

When, as a result of the determination, the time being clocked has exceeded the predetermined time, the process proceeds to step S704, or the process proceeds to step S703 when the time being clocked has fallen below the predetermined time.

At step S703, the PTZ control program 304 determines whether or not a change in PTZ (change in at least one of P, and Z) has been detected. When, as a result of the determination, a change in PTZ has been detected, the process proceeds to step S701, or the process proceeds to step S702 when no change in PTZ has been detected.

At step S704, the image storing program 306 acquires one of captured images from the image capturing program 302, and stores (overwrites) the acquired captured image in the secondary memory 204 as the image data 310. The captured image to be stored may be stored after being subjected to rendering as appropriate. For example, the one of captured images acquired from the image capturing program 302 may be subjected to image processing or processes such as character superimposition so as to be distinguished from live-distributed images. Furthermore, resolution, image format, or the like may be changed when storing the captured image.

At step S705, it is determined whether or not a change in PTZ (change in at least one of P, T and Z) has been detected at or subsequent to step S701. Note that, at step S705, it may be determined whether or not a request to control the PTZ of the image capturing apparatus 102 from the client terminal apparatus 103 has been received (when received, it is determined that a change in PTZ has been detected). In addition, it may be determined that a change in PTZ has been detected when the change in PTZ has exceeded 3% relative to the PTZ movable range, considering a case where the PTZ is physically operated from the outside. As thus described, the configuration for "detecting a change in PTZ" is not limited to a specific configuration.

When, as a result of such a determination, a change in PTZ has been detected at or subsequent to step S701, the process proceeds to step S706, or the process proceeds to step S705 when no change in PTZ has been detected at or subsequent to step S701.

At step S706, the image storing program 306 stores the time clocked up to now (time passed since the start of measurement to the current time point) in the secondary memory 204 as elapsed time. The elapsed time stored here may be used as the predetermined time described above. The form of storing the elapsed time is not limited to a specific storage form, and the elapsed time may be stored as header data of the image data 310, for example, or may be stored as text data separate from the image data 310. The process then proceeds to step S701.

As described above, in the present embodiment, elapsed time is counted each time PTZ control is performed even when the image capturing apparatus 102 is the activation state, and the image data 310 stored in the secondary memory 204 is updated when a predetermined time has elapsed. Accordingly, the client terminal apparatus 103 can acquire and display an image at a location where the image capturing apparatus 102 has been performing image capturing for the longest time, as a captured image acquired in response to an image acquisition request from the image capturing apparatus 102 in the standby state. Accordingly, the convenience when the user is selecting from the list of image capturing apparatuses increases.

Third Embodiment

In the present embodiment, as with the first embodiment and the second embodiment, controls whether or not to overwrite the captured image acquired from the image capturing program 302 by the image storing program 306 over the image data 310 already stored in the secondary memory 204.

Figure 8:
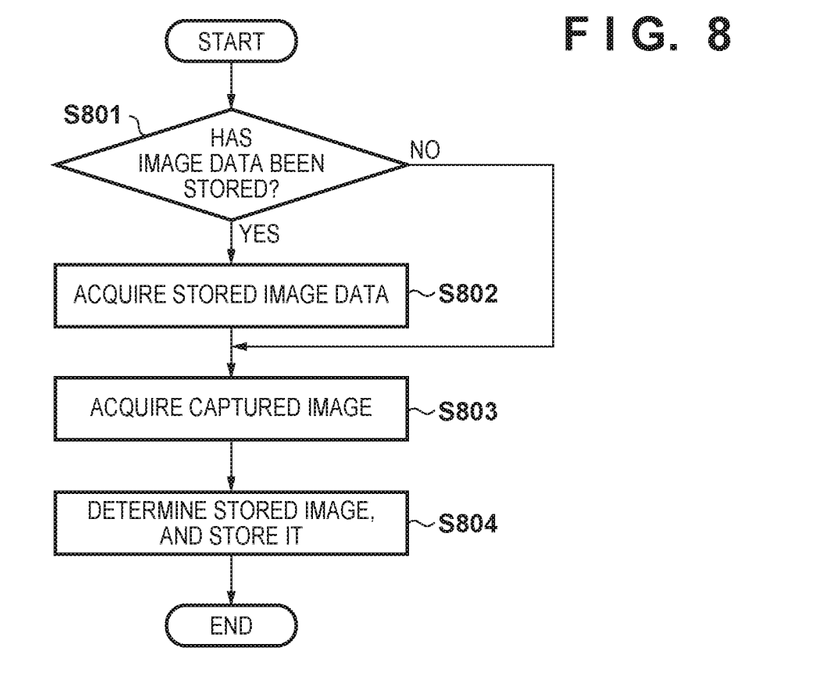
FIG. 8 is a flowchart of a process performed by the image capturing apparatus 102.

A process for controlling whether or not to overwrite, by the image storing program 306, the captured image acquired from the image capturing program 302 over the image data 310 previously stored in the secondary memory 204 will be described in accordance with the flowchart of FIG. 8.

At step S801, the image storing program 306 determines whether or not the image data 310 has already been stored in the secondary memory 204. When, as a result of the determination, the image data 310 has already been stored in the secondary memory 204, the process proceeds to step S802, or the process proceeds to step S803 when the image data 310 has not yet been stored in the secondary memory 204.

At step S802, the image storing program 306 acquires the image data 310 already stored in the secondary memory 204. At step S803, the image storing program 306 acquires one of captured images from the image capturing program 302.

The operation of the image storing program 306 at step S804 is different for when the image storing program 306 performs the process of step S802 and for when the image storing program 306 is not performing the process of step S802.

When performing the processes of step S802, the image storing program 306 determines which of the "image data 310" acquired at step S802 or the "captured image" acquired at step S803 is to be stored in the secondary memory 204 as a new version of the image data 310. The method for determining an image to be stored in the secondary memory 204 as a new version of the image data 310 is not limited to a specific method. For example, the image to be stored in the secondary memory 204 as a new version of the image data 310 may be determined by comparing histograms of luminance values of respective images and selecting an image with less blown-out highlights or shadow detail loss. In addition, a better-focused image (sharper image acquired by comparing sharpness of images) may be determined as the image to be stored in the secondary memory 204 as a new version of the image data 310. As described above, the image to be stored in the secondary memory 204 may be determined as a new version of the image data 310 on the basis of image information of respective images.

The image storing program 306 then does nothing when having determined to store the "image data 310" acquired at step S802 in the secondary memory 204 as a new version of the image data 310. When, on the other hand, having determined to store the "captured image" acquired at step S803 in the secondary memory 204 as a new version of image data 310, the image storing program 306 stores (overwrites) the "captured image" in the secondary memory 204 as the image data 310.

When, on the other hand, the process of step S802 has not been performed, the image storing program 306 stores (overwrites) the "captured image" acquired at step S803 in the secondary memory 204 as a new version of the image data 310.

As thus described, comparison with the already stored image data 310 for a better appearance when determining whether or not to update the image data 310 provides the user with an easier-to-view image in the list of image capturing apparatuses, increasing the convenience thereby.

Fourth Embodiment

Although a case of executing various computer programs described above by a single computer (CPU) has been described in the aforementioned embodiments, the various computer programs described above may be executed by a plurality of computers.

In addition, deactivation of the image capturing function is not limited to deactivate acquisition of captured images by the image capturing unit 206. For example, the power being supplied to the image capturing unit 206 may be reduced to be lower than the power supplied in the activation state. In addition, a part or all of the aforementioned embodiments may be used in combination as appropriate. In addition, a part or all of the aforementioned embodiments may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-044193, filed Mar. 11, 2019, which is hereby incorporated by reference herein in its entirety.

What is claimed is:

1. An image capturing apparatus capable of capturing an image, the image capturing apparatus comprising a computer executing instructions that, when executed by the computer, cause the computer to:
   store, in a memory, the image, in response to receiving a transition request to a standby state in which an image capturing function of the image capturing apparatus is deactivated; and
   transmit the image stored in the memory to a client apparatus, in a case where the image capturing apparatus in the standby state receives an image acquisition request.

2. The image capturing apparatus according to claim 1, wherein the instructions further cause the computer to move pan, tilt, and zoom of the image capturing apparatus to a predefined setting value in response to receiving the transition request.

3. The image capturing apparatus according to claim 1, wherein the image is captured and stored in the memory after pan, tilt, and zoom of the image capturing apparatus has been moved to a predefined setting value in response to receiving the transition request.

4. The image capturing apparatus according to claim 1, wherein, in a case where the image capturing apparatus in the standby state receives the image acquisition request, the image stored in the memory and information indicating that the image capturing apparatus is in the standby state are transmitted to the client apparatus.

5. The image capturing apparatus according to claim 1, wherein in response to receiving the image acquisition request in an activation state where the image capturing function is activated, the image captured in the activation state is transmitted.

6. The image capturing apparatus according to claim 1, wherein in response to receiving the image acquisition request in an activation state where the image capturing function is activated the image captured in the activation state and information indicating that the image capturing apparatus is in the activation state are transmitted to the client apparatus.

7. The image capturing apparatus according to claim 1, wherein the image is to be stored in the memory, in a case where a time period during which no change has been detected in one or more of pan, tilt and zoom of the image capturing apparatus has exceeded a predetermined time period.

8. The image capturing apparatus according to claim 1, wherein the instructions further cause the computer to, in a case where an image has already been stored in the memory, determine whether or not to overwrite the image newly captured over the already stored image, based on image information of the already stored image and the newly captured image.

9. A control method of an image capturing apparatus capable of capturing an image, the control method comprising:
    storing, in a memory, the image, in response to receiving a transition request to a standby state in which an image capturing function of the image capturing apparatus is deactivated; and
    transmitting the image stored in the memory to a client apparatus, in a case where the image capturing apparatus in the standby state receives an image acquisition request.

10. A non-transitory computer readable medium that stores a program, wherein the program causes a computer to execute a control method of an image capturing apparatus capable of capturing an image, the control method comprising:
    storing, in a memory, the image, in response to receiving a transition request to a standby state in which an image capturing function of the image capturing apparatus is deactivated; and
    transmitting the image stored in the memory to a client apparatus, in a case where the image capturing apparatus in the standby state receives an image acquisition request.

11. An image capturing apparatus capable of capturing an image, the image capturing apparatus comprising a computer executing instructions that, when executed by the computer, cause the computer to:
    receive an image acquisition request for requesting an image captured by the image capturing apparatus; and
    transmit an image captured by the image capturing apparatus to a client apparatus, in a case where the image capturing apparatus receives the image acquisition request,
    wherein in a case where (a) the image capturing apparatus receives the image acquisition request and (b) it is determined that the image capturing apparatus is in a standby state in which an image capturing function of the image capturing apparatus is deactivated, an image which was captured by the image capturing apparatus and stored in a memory before the image capturing apparatus transitions to the standby state is transmitted to the client apparatus.

12. The image capturing apparatus according to claim 11, wherein the instructions further cause the computer to determine whether the image capturing apparatus is in the standby state or in an activation state in which the image capturing function is activated, and
    wherein in a case where (a) the image capturing apparatus receives the image acquisition request and (b) it is determined that the image capturing apparatus is in the activation state, not the stored image but a live image captured by the image capturing apparatus is transmitted to the client apparatus.

13. The image capturing apparatus according to claim 11, wherein the instructions further cause the computer to
    receive an transition request to the standby state in which the image capturing function of the image capturing apparatus is deactivated; and
    store, in the memory, an image which was captured by the image capturing apparatus before the image capturing apparatus transitions to the standby state in accordance with the transition request.

14. The image capturing apparatus according to claim 11, wherein the stored image in the memory is to be update by an image captured by the image capturing apparatus, in a case where a predetermined period passed after at least one of pan, tilt, and zoom of the image capturing apparatus changed.

15. The image capturing apparatus according to claim 11, wherein in a case where (a) the image capturing apparatus receives the image acquisition request and (b) it is determined that the image capturing apparatus is in the standby state, the stored image and information indicating that the image capturing apparatus is in the standby state are transmitted to the client apparatus.

16. A control method of an image capturing apparatus capable of capturing an image, the control method including:
    receiving an image acquisition request for requesting an image captured by the image capturing apparatus; and
    transmitting an image captured by the image capturing apparatus to a client apparatus, in a case where the image capturing apparatus receives the image acquisition request,
    wherein in a case where (a) the image capturing apparatus receives the image acquisition request and (b) it is determined that the image capturing apparatus is in a standby state in which an image capturing function of the image capturing apparatus is deactivated, an image which was captured by the image capturing apparatus and stored in a memory before the image capturing apparatus transitions to the standby state is transmitted to the client apparatus.

17. A non-transitory computer readable medium that stores a program, wherein the program causes a computer to execute a control method of an image capturing apparatus capable of capturing an image, the control method comprising:
    receiving an image acquisition request for requesting an image captured by the image capturing apparatus; and transmitting an image captured by the image capturing apparatus to a client apparatus, in a case where the image capturing apparatus receives the image acquisition request, wherein in a case where (a) the image capturing apparatus receives the image acquisition request and (b) it is determined that the image capturing apparatus is in a standby state in which an image capturing function of the image capturing apparatus is deactivated, an image which was captured by the image capturing apparatus and stored in a memory before the image capturing apparatus transitions to the standby state is transmitted to the client apparatus.

* * * * *